United States Patent [19]

Berselli

[11] Patent Number: 5,099,709
[45] Date of Patent: Mar. 31, 1992

[54] STEPLESS VARIABLE SPEED DRIVE

[75] Inventor: Francesco Berselli, Bologna, Italy

[73] Assignee: Varvel S.p.A., Bologna, Italy

[21] Appl. No.: 662,979

[22] Filed: Feb. 28, 1991

Related U.S. Application Data

[63] Continuation of Ser. No. 343,600, Apr. 27, 1989, abandoned.

Foreign Application Priority Data

Apr. 29, 1988 [IT] Italy ................ 3438 A/88

[51] Int. Cl.$^5$ ............................................. F16H 15/22
[52] U.S. Cl. ............................................. 74/191; 74/18;
 74/199; 277/30
[58] Field of Search .................. 74/18, 190, 191, 199,
 74/207, 212, 566; 277/30

[56] References Cited

U.S. PATENT DOCUMENTS

| 1,498,917 | 6/1924 | Hutchins | 277/30 |
| 1,885,046 | 10/1932 | Bennett | 277/30 |
| 2,842,001 | 7/1958 | Hunting | 74/191 |

FOREIGN PATENT DOCUMENTS

| 157669 | 5/1953 | Australia | 74/199 |
| 3411130 | 10/1985 | Fed. Rep. of Germany | 74/190 |
| 1480236 | 4/1967 | France . | |
| 2031820 | 11/1970 | France . | |
| 276660 | 7/1970 | U.S.S.R. | 277/30 |
| 399056 | 9/1933 | United Kingdom | 74/199 |

Primary Examiner—Allan D. Herrmann
Attorney, Agent, or Firm—Banner, Birch, McKie & Beckett

[57] ABSTRACT

The variable speed drive comprises a driving shaft and a driven shaft coupled by a friction disk assembly, and is accommodated by a fixed case affording passage and support to the driven shaft, and a cover, adjustable for position in relation to the fixed case and affording passage and support to the driving shaft; the gap between the adjustable cover and the case is bridged by an impermeable boot-type seal anchored at its inner and outer edges in a fluid-tight fit to the cover and the case, respectively, and capable of flexing at least radially in relation to the two shafts. The cover incorporates a boss extending through the open center of the boot seal into the case and engaging with rods by which movement of the cover is guided, and to advantage, the seal is pleated with looped corrugations spreading out around the boss.

6 Claims, 2 Drawing Sheets

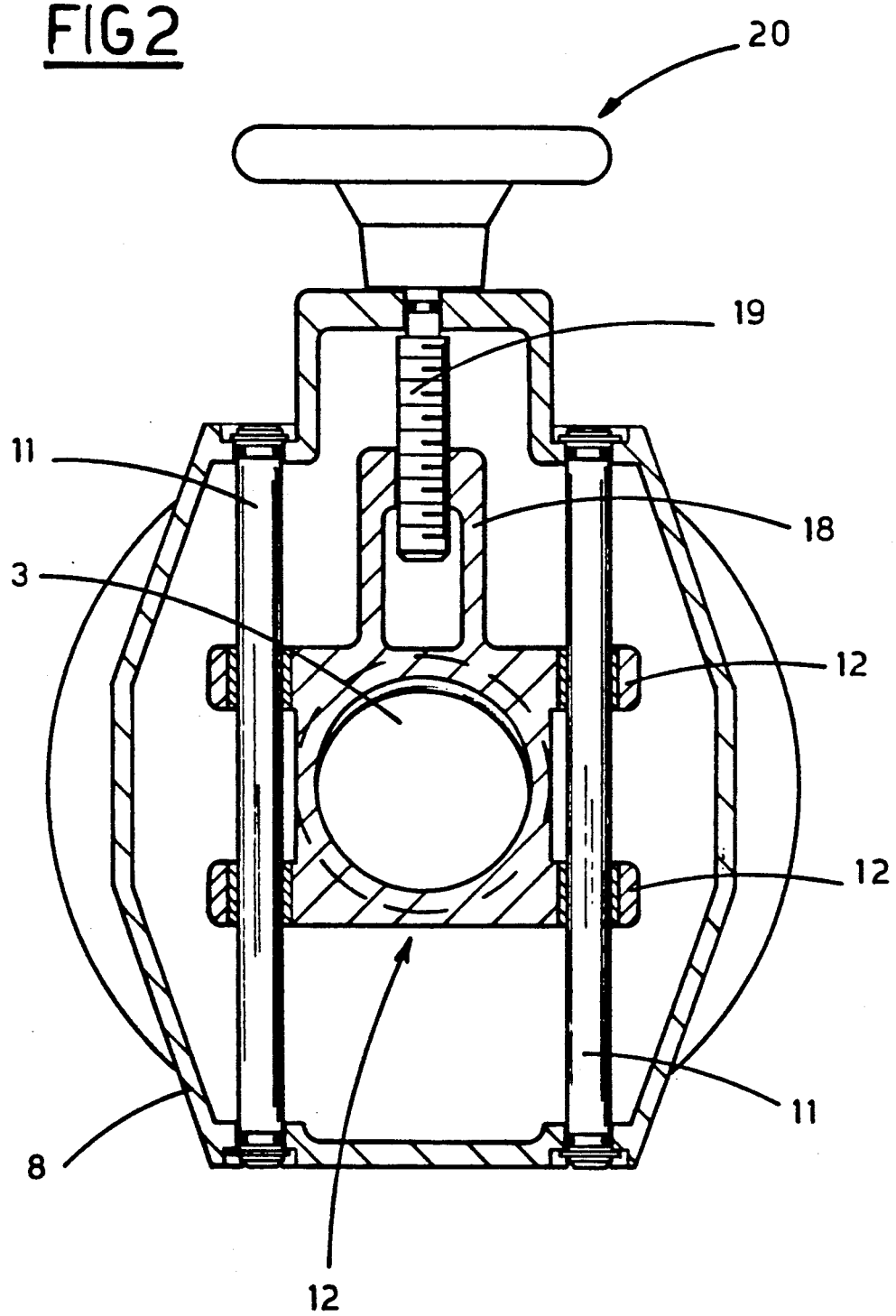

STEPLESS VARIABLE SPEED DRIVE

This application is a continuation of application Ser. No. 07/343,600, filed Apr. 27, 1989 now abandoned.

BACKGROUND OF THE INVENTION

The invention relates to a stepless variable speed drive.

Conventional power transmission devices of the type in question comprise a bevel friction disk, constituting the driving member, and a driven ring; the two members engage in dry contact, the driven ring being urged against the disk by a spring, and are arranged in such a way that the speed of the driven member is infinitely variable in relation to the driving member.

The axis of the driving friction disk is canted in relation to that of the driven ring through an angle substantially complementary to the cone angle of its bevel, in such a way that the surface of the driven ring lies tangential to the surface of the disk at the point where contact is made between them —i.e., in such a way that mating contact covers the maximum area obtainable.

It will be clear enough that frictional contact between the driving and driven members needs to be as great as possible if dependable and long-lasting operation is to be ensured, and accordingly, the environment by which the friction disk and driven ring are accommodated must be clean and dry, in order to ensure a high coefficient of friction.

In conventional single-disk embodiments, the disk and the driven ring are keyed respectively to the driving and driven shafts of the unit, and housed in a fixed case with an adjustable cover; the driving and driven shafts pass in a fluid-tight fit through the adjustable cover and the fixed case, and are supported by them respectively.

The cover generally affords a mounting for the motor by which the friction disk is driven, and is capable of shifting in relation to the fixed case to the end of varying the distance between the axis of rotation of the disk and the area of contact between disk and wheel commensurately with the extent of the shift induced. Given steady input speed, lengthening or shortening this distance produces a corresponding variation in tangential velocity at the area of contact, and as the distance between the area of contact and the axis of the driven shaft remains constant, one obtains a variation in the speed of the driven shaft.

Advantageously, the cover will generally be fitted to the fixed case by way of straight guides in order to obtain an accurate adjustment of the speed of the driven shaft; however, an accompanying disadvantage is that gaps remain between the cover and the case.

The existence of these gaps dictates the ned for seals that are somewhat complex in embodiment, given the type of fit and the variation in the size of the gaps; at all events, the seals in question are not fully able to ensure the exclusion of dust, moisture, oils and other agents that have the effect of lowering the coefficient of friction. Moreover, this loss of friction occasioned by infiltration of foreign matter, or by excessive build-up of moisture internally of the case, is compounded further by the fact that penetration of such agents into the case and between the disk and wheel occurs sporadically, rather than continuously; as a result, transmissible power and torque can vary unexpectedly, and the rated performance of the unit becomes erratic.

One sealing arrangement conventionally adopted consists in the use of a pair of rigid protective elements located between the friction disk and the cover and breasted together in frontal contact, one fastened to the fixed case, the other to the movable cover; a seal of felt or other similar material is attached to one of the two rigid elements, say to the movable element, the covers and entire are of the surface offered to the remaining element.

The movable protective element needs to exhibit a larger surface area on either side of the driving shaft than that of the gap in the fixed element against which it slides, in order to ensure that no gaps remain between the two elements.

In another arrangement, seals are located between the guides of the cover, though in this instance too one has a sealing action between relatively mobile straight surfaces that is insufficiently tight and difficult to embody, as those skilled in the art will be aware.

The result is that stepless variable speed drives of the type in question require regular servicing, and more exactly, the seals must be inspected and/or replaced regularly in order to ensure that abnormal or excessive wear will not further jeopardize what is, in any event, a less-than-perfect sealing action.

Accordingly, the object of the invention is one of embodying a stepless variable speed drive of the single friction disk type, in which fully effective sealing action is ensured against any agent tending to lower the coefficient of friction.

A further object of the present invention is to provide a stepless variable speed drive that affords long-term dependability and is capable of responding stably to its rated performance characteristics.

SUMMARY OF THE INVENTION

The stated objects are achieved with a stepless variable speed drive as disclosed herein.

In a stepless drive according to the invention, which is of the type comprising driven and driving members coupled through a dry friction transmission link and journaled respectively to a fixed case, and to a cover that is adjustable for position in relation to the case and embodied with a boss which extends into the case and combines with it to create guides, the gap remaining between the case and the cover is bridged by a boot-type seal encircling the driving member anchored by its inner and outer edges to the cover and the case, respectively, and capable of substantially radial deformation, considered in relation to the driveline.

In a preferred embodiment of the invention, the seal will be pleated with corrugation that encircle the boss of the cover.

A first advantage of the drive according to the invention is essentially that of the simplicity in construction achieved by dispensing with dynamic seals and adopting a static arrangement.

Another advantage of the invention is that one can gain a considerable increase in travel of the cover, especially with a corrugated seal, without greatly increasing the size of the case. This is rendered possible by virtue of the fact that the inner edge of the seal can move freely in relation to the outer edge, whereas in conventional sealing arrangements, the distance between these two edges remains fixed, and is dictated by the travel of the cover.

BRIEF DESCRIPTION OF THE DRAWINGS

The invention will now be described in detail, by way of example, with the aid of the accompanying drawings, in which:

FIG. 2 is the section through II—II in FIG. 1.

DESCRIPTION OF THE PREFERRED EMBODIMENTS

Figure 1:
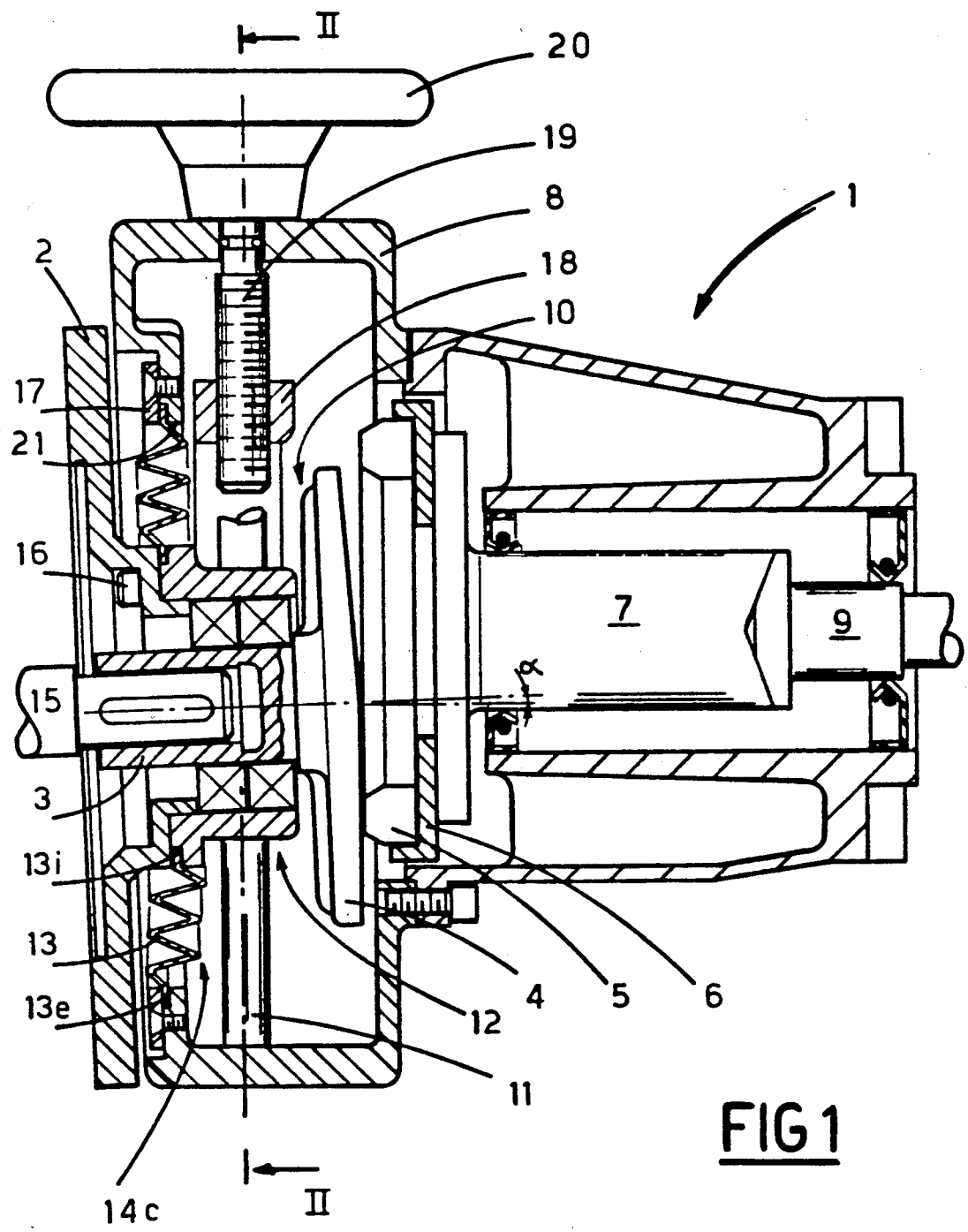
FIG. 1 is a side elevation of the stepless variable speed drive disclosed, viewed for the greater part in longitudinal section.

Referring to FIG. 1 of the drawings, 1 denotes a stepless variable speed drive unit, in its entirety, of the basic type comprising a driving shaft 3 and a driven shaft 9 coupled kinematically by way of an assembly 10 that consists in a dry running friction clutch.

The coupling assembly 10 comprises a bevel disk 4 integral with the end of the driving shaft 3, and a driven ring 5 fastened by conventional means to the flanged end 6 of a sleeve 7 keyed onto the driven shaft 9. The driven ring 5 is kept in contact with the friction disk 4 by a spring (not visible in the drawings) seated between the sleeve 7 and the driven shaft 9.

The coupling assembly 10 is housed internally of a fixed case 8 that may be embodied in one piece, or fabricated as in FIG. 1, and can be mounted to the driven machine; the driven sleeve 7 and shaft 9 are journaled to the case 8 by conventional means (not illustrated), and provided with suitable seals.

21 denotes an opening let into the end of the case 8 opposite that occupied by the driven shaft 9; the opening 21 is disposed transversely to the two shafts, and designed to accept an adjustable cover 2 capable of movement in relation to the case 8.

The driving shaft 3 is hollow and passes through the cover 2, journaled thereto by conventional means that are not illustrated; 15 denotes the shaft end of a prime mover (likewise not illustrated) to which the shaft 3 is keyed. The cover 2 is capable of a degree of movement in relation to the case 8, whilst being supported by it in such a way that the axis of the driving shaft 3 remains inclined through a given angle $\alpha$ in relation to that of the driven shaft 9. In effect, the angle $\alpha$ will be complementary to the cone angle of the bevel disk 3, in order to ensure that the driven ring 5 remains tangential to the disk 4 across the area where contact is made between them.

According to the invention, the seal between the adjustable cover 2 and the fixed case 8 is provided by a boot-type element denoted 13, that is fashioned from either impermeable or impermeabilized material and encircles the driving shaft 3; more exactly, the sealing element 13 is anchored to the cover 2 by its internal edge 13i, and to the case 8 by its external edge 13e, and capable of what is substantially a radical deformation, considered in relation to the two shafts 3 and 9.

In the embodiment illustrated, the cover 2 projects into and combines with the case 8 to create guide means denoted 11 and 12, consisting in a pair of parallel rods 11 disposed perpendicular to the driven shaft 9 and anchored rigidly to the case 8, and a hollow appendage or boss 12 issuing from the cover 2, which accommodates the driving shaft 3 coaxially and engages the parallel rods 11 at right angles.

The boss 12 may be either embodied integrally with the cover 2, or fixed thereto with threaded fasteners 16, as in FIG. 1, in which case it becomes possible to locate the internal edge 13i of the sealing element 13 behind the boss 12 and clamp it firmly against the cover 2. The external edge 13e, on the other hand, is clamped by a rim 17 against the outer surface of the case 8 that surrounds the opening 21.

The adjustable cover 2 is associated with means by which to alter its position relative to the case 8; in the embodiment illustrated, such means take the form of a control screw 19, passing through and supported by the case 8 in a fluid-tight fit, that engages a lead nut 18 integral with the boss 12.

The control screw 19 is freely rotatable in the wall of the case 8, operated by manual or automatic means 20 such as a conventional handwheel (see both drawings). Turning the handwheel 20, the screw 19 rotates and, being unable to move axially, causes the boss 12 to move along the rods 11.

It will be observed from FIG. 1 that the action of the impermeable and deformable sealing element 13 is static, associating as it does with the relatively mobile cover 2 and case 8 exclusively by way of its internal and external edges 13i and 13e.

It will be observed further that movement of the cover 2 along the rods 11 is enabled by the inherent deformability of the material and used to manufacture the element 13; this deformability can be obtained quite simply by adopting a flexible material such as rubber, or better still, by pleating the flexible material with looped corrugations 14 that radiate in substantially concentric fashion from the boss 12. Thus, when the cover 2 is moved along the rods 11, the corrugations of the sealing element 13 will be stretched out on one side and folded together on the other, in the manner of a typical boot seal.

By proportioning the corrugations 14 suitably, the difference in the dimensions of the stretched and folded sides of the element 13 can be increased considerably, and made substantially to match the maximum travel of the cover 2.

Compared with the conventional embodiments referred to at the outset, the expedient according to the invention permits of obtaining a notable reduction in the dimensions of stepless variable speed drives of the type in question, by virtue of the fact that the sealing element 13 deforms without effectively moving in relation to the case 8.

What is claimed is:

1. A stepless variable speed drive unit of the type comprising a driving shaft and a driven shaft connected kinematically by way of a dry-running friction coupling through which variable speed transmission occurs, said coupling is accommodated in a housing including a fixed case, affording passage and support of the driven shaft, and a dover capable of guided movement via guiding means in relation to said fixed case and affording passage and support of the driving shaft;

wherein the movable cover includes a boss which projects into said fixed case in which said guiding means are internally located;

wherein said guiding means include parallel rods supported by the fixed case, disposed normal to the driven shaft, and engaged slidably by at least one appendage of said boss;

wherein a sealing element is located between said movable cover and said fixed case; and wherein said sealing element is made of impermeable or impermeabilized material, is anchored by its internal and external edges to said boss and said fixed case, respectively, and is capable of substantial radial deformation considered in relation to the driving and driven shafts.

2. A stepless variable speed drive, comprising:

a driving shaft and a driven shaft, associated kinematically by way of an assembly consisting in a dry-running friction coupling through which transmission occurs;

a housing, accommodating the friction coupling, composed of a fixed case affording passage and support to the driven shaft, and a separate and distinct movable cover capable of movement in relation to the fixed case and affording passage and support to the driving shaft;

said fixed case including an inner peripheral surface and an outer peripheral surface wherein said inner peripheral surface defines an open interior compartment and said outer peripheral surface generally coincides with said inner peripheral surface surrounding said open interior compartment to thereby define the exterior of said fixed case;

said movable cover being disposed exterior to said fixed case;

guiding means located internally of said fixed case in said open interior compartment for guiding the movement of said movable cover; and a sealing element located between said fixed case and said movable cover, embodied in impermeable or impermeabilized material and affording a hole substantially at center to admit the driving shaft, anchored by its internal and external edges to said movable cover and said fixed case, respectively, and capable of substantial radial deformation considered in relation to the driving and driven shafts.

3. A variable speed drive as in claim 2, wherein said guiding means are formed by said movable cover projecting into and combining with said fixed case.

4. A variable speed drive as in claim 2, wherein said guiding means comprise parallel rods that are supported by said fixed case, disposed normal to said driven shaft, and engaged slidably by at least one appendage issuing from said movable cover.

5. A variable speed drive as in claim 2, wherein said sealing element is embodied in a supple material and pleated with looped corrugations that encircle the driving shaft.

6. A variable speed drive as in claim 2, wherein said guiding means further comprise parallel rods supported by said fixed case and a boss which extends through the hole of said sealing element into said fixed case and engages with said rods, by which movement of said movable cover is guided.

* * * * *